Dec. 12, 1944.  J. M. TYRNER  2,364,881
WELDING TRANSFORMER
Filed Sept. 10, 1942
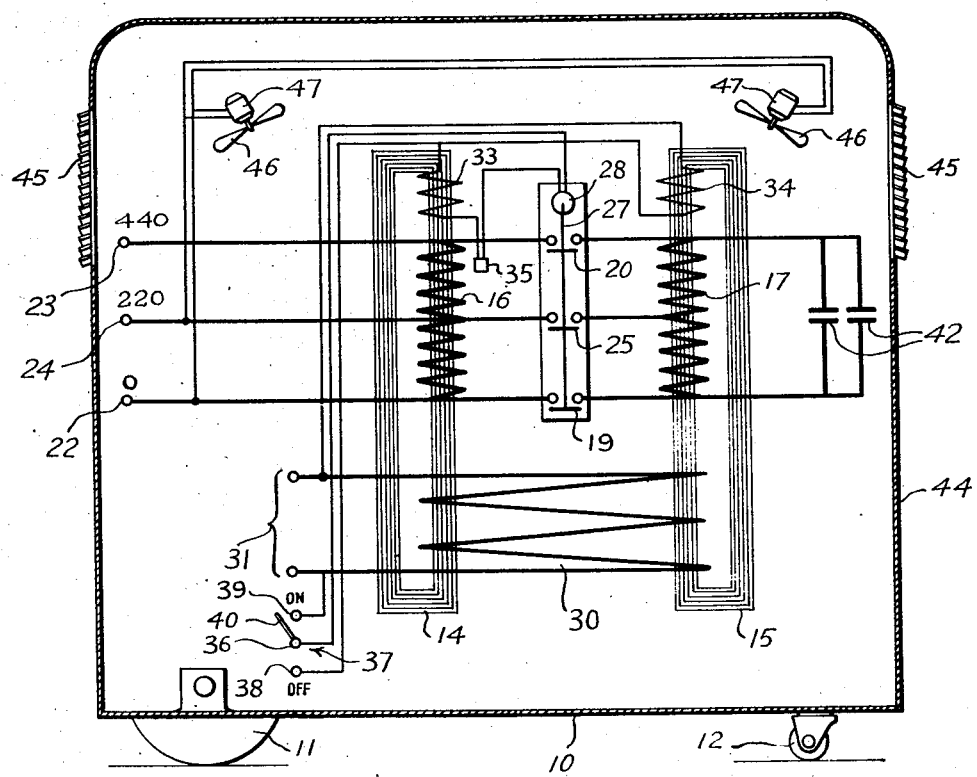
INVENTOR.
JOSEPH M. TYRNER
BY J. H. Brandenburg
ATTORNEY Patented Dec. 12, 1944

2,364,881

UNITED STATES PATENT OFFICE 2,364,881

WELDING TRANSFORMER

Joseph M. Tyrner, Englewood, N. J., assignor to Air Reduction Company, Incorporated, New York, N. Y., a corporation of New York Application September 10, 1942, Serial No. 457,897

9 Claims. (Cl. 171—119)

This invention relates to electric arc welding with alternating current.

It is an accepted fact that alternating current is more dangerous than direct current of the same voltage. One reason is that the peak voltage with alternating current is about 40% higher than the effective alternating current voltage and the corresponding direct current voltage. Another reason is the different reaction of the human body to steady and to alternating electric current.

The open-circuit voltages commonly used with alternating and direct-current welding equipment are about the same, from 60 to 90 volts. This is reasonably safe with direct current, but is on the border of being dangerously high with alternating current. Various plans have been devised for reducing the open-circuit voltage of alternating-current equipment and yet providing for sufficient voltage and current to start the arc.

It is an object of this invention to provide improved alternating-current welding apparatus that has an open-circuit voltage that is not dangerous and yet has ample voltage and current for starting the arc.

Another object of the invention is to provide an improved welding apparatus with automatic voltage control. The apparatus is, in effect, two transformers with the primaries connected in parallel and the secondaries in series. If two such transformers are alike, the disconnecting of one of them will halve the open-circuit voltage of the secondary circuit. By placing a contactor in the primary circuit it need carry only half of the primary current, instead of the full welding load as in the case of contactors in the secondary circuit.

In accordance with one feature of the invention the use of relays is dispensed with by using one or more auxiliary windings to operate the contactor.

In accordance with another feature, the apparatus is constructed with a single secondary winding which embraces the separate cores of both of the primary windings.

Another object of the invention is to provide a welding transformer with improved power factor correction. The correction capacitors of this invention are not effective when the transformer is idling.

The invention includes also improved cooling facilities comprising means for circulating a cooling fluid and automatic control of the circulating means.

Other features relate to overheating protection, enclosure, and portability of the welding apparatus.

Other objects, features and advantages of the invention will appear or be pointed out as the specification proceeds.

The drawing is a diagrammatic sectional view of welding apparatus embodying the invention.

A carriage 10 has rear wheels 11 and one or more caster wheels 12 for stably supporting it on a floor or other surface. Two closed iron circuits, comprising transformer cores 14 and 15, are mounted on the carriage. There is a primary winding 16 on one leg of the core 14 and a similar primary winding 17 on a leg of the other core 15.

The primary windings 16 and 17 are connected in parallel by a switch 19 at their lower ends and a switch 20 at their upper ends. These windings 16 and 17 are designed for a voltage of 440 volts across terminals 22 and 23 of the transformer. There are center taps on the windings 16 and 17 connected with a terminal 24 for operating the transformer from a 220 volt supply. A switch 25 connects the center taps of the windings 16 and 17.

The switches 19, 20 and 25 are connected with a rod 27, the upper end of which extends into a solenoid coil 28. These switches and the rod 27 are the contactor for connecting and disconnecting the primary winding 17 and the supply line.

A single secondary winding 30 embraces both of the cores 14 and 15. This secondary winding 30 is connected through terminals 31 with arc welding equipment, and is the work circuit of the transformer apparatus.

The contactor is moved by gravity to open the switches 19, 20 and 25, but when current is supplied to the coil 28 the rod 27 is drawn up by the coil and all of the switches 19, 20 and 25 are closed and held closed until the current in the coil 28 is interrupted.

One side of the coil 28 is connected with auxiliary windings 33 and 34. on the cores 14 and 15, respectively, through a thermostat 35. The other side of the coil 28 is connected with a contact 36 of a safety switch 37. The auxiliary windings 33 and 34 are connected with a contact 38 of the safety switch 37. A third contact 39 connects with the lower terminal 31 of the secondary winding 30.

A blade 40 of the safety switch 37 can be moved into one position in which it connects the contacts 36 and 38 so that the solenoid coil 28 is connected across the auxiliary winding 33 on the core 14 of the transformer. With the safety switch 37 in this position the automatic control of the open circuit voltage is not effective, because the auxiliary winding 33 keeps the holding coil 28 continuously energized.

When the blade 40 of the safety switch 37 is raised to connect the contacts 38 and 39, the solenoid coil is in series with both of the auxiliary windings 33 and 34, and this circuit is connected across the secondary winding 30.

The auxiliary secondary windings 33 and 34 have the same number of turns as the main secondary winding 30. These windings are connected so that the voltages in the auxiliary windings 33 and 34 oppose the voltage in the main secondary winding 30. Therefore, no current flows in these windings on idling and no current flows in the solenoid or holding coil 28 which is connected in series with the auxiliary windings 33, 34.

If the terminals of the main secondary winding 30 are short-circuited by striking an arc, the auxiliary secondary windings 33 and 34 are short-circuited too and the resulting current excites the holding coil 28 and operates the contactor by moving the rod 27 and closing all of the switches 19, 20 and 25. This connects primary winding 17 in the circuit, but the resulting excitation of the winding 17 affects the main and auxiliary secondary windings alike.

When an arc is drawn and maintained, the voltage that operates the holding coil 28 is the voltage induced in both of the auxiliary secondary windings 33, 34 minus the drop caused by their impedance and minus the arc voltage. If the full secondary open-circuit voltage of the transformer apparatus is 80 volts, the voltage excited by each primary winding 16, 17 is 40 volts. Thus 40 volts is the voltage at which the auxiliary secondary winding 33 operates the contactor and holding coil 28. After the switches 19, 20 and 25 of the contactor have closed, the voltage in the secondary windings goes up to 80 minus impedance drop and minus the arc voltage of about 30 volts. Therefore, the contactor is operated by a practically constant voltage of about 40 volts.

Modern welding transformers have power-factor correction which by means of capacitors bring the power-factor near to unity on rated load. On open circuit a comparatively large amount of leading kva. is available. At first glance, the availability of this leading power seems to be an advantage. Actually it throws the line only more out of balance. The single phase load oscillates between the lagging current on load, and the considerable leading current of the idling period. Only when a large number of transformers are evenly distributed in a polyphase line, will the leading power compensate the lagging load. But if only a few transformers are used, one leg of the power supply may have a leading and the other a lagging load. It is clear that it is better if the line load swings between load with power-factor correction and idling without it.

Capacitors 42 are connected across the ends of the primary winding 17. The upper parts of the primary windings are used as auto transformers when operating the apparatus from a 220 volt line. By connecting the capacitors across the primary winding 17 that is disconnected when the apparatus is idling with reduced secondary voltage, there is no power-factor correction during such idling periods. The connection of the capacitors to the transformer winding that is disconnected during idling periods helps considerably because it short-circuits this primary winding and reduces the reactance of the system at the moment when the arc is first struck and thus increases the available current, making striking of the arc and operation of the contactor easier.

All of the transformer structure, including the cores, windings, contactor, and capacitors, is preferably an integral unit supported on the frame of the carriage 10 and enclosed in a housing 44 of the carriage. The housing has louvers 45 for ventilation. Fans 46 draw air in through the louvers 45 and blow it against the transformer parts so that the air circulates around the cores and windings as a cooling fluid. The housing 44 is preferably open at the bottom.

The fans 46 have motors 47 connected in parallel across the 220 volt terminals of the primary winding 16 so that the fans operate whenever the apparatus is in use, either on full voltage or reduced voltage. The apparatus can be cooled by other means, and if liquid-cooled, the motors 47 are the motors of the circulating pumps.

The thermostat 35 is normally closed and opens in response to excessive heating of the transformer. The opening of the thermostat circuit, however, does not put the apparatus completely out of operation. The circuit of the holding coil 28 is broken and the switches 19, 20, and 25 open, disconnecting the primary winding 17. The apparatus can continue to operate, but at reduced output, and the cooling system continues to function because the motors of fans 46 are connected across the primary winding 16 that always remains in the power supply circuit.

The opening of the thermostat 35 reduces the output of the transformer apparatus regardless of the position of the safety switch 37.

The preferred embodiment of the invention has been described, but changes and modifications can be made and some features of the invention can be used without others.

I claim:

1. An arc welding device including transformer apparatus comprising two primary windings connected in parallel, a switch through which one of the primary windings is connected with the other, a secondary circuit for supplying welding current, and automatic control means responsive to the flow of current in the secondary circuit for operating the switch.

2. A welding transformer comprising two separate closed iron cores, a primary winding surrounding a portion of one iron core, another primary winding surrounding a portion of the other iron core, a single secondary winding embracing portions of both the iron cores, and a switch in the primary circuit in position to disconnect one of the primary windings from a power source independently of the other to reduce the voltage excited in the secondary winding.

3. A welding transformer comprising a primary circuit including two primary windings on different cores, a main secondary circuit, an auxiliary secondary circuit of substantially the same voltage as the main secondary circuit and connected with the main secondary circuit in such a way that the voltages of the secondary circuits oppose one another, switch means for connecting the second of the primary windings with a power line, and a switch-operating coil for the switch means, said coil being connected in series with the auxiliary secondary circuit.

4. A welding transformer comprising a primary circuit including two primary windings on different cores, a main secondary circuit, an auxiliary secondary circuit of substantially the same voltage as the main secondary circuit and connected with the main secondary circuit in such a way that the voltages of the secondary circuits oppose one another, said auxiliary secondary circuit including two windings, each on a different one of the cores of the respective primary windings, switch means for connecting the second of the primary windings with a power source, and an operating coil for the switch means, the two auxiliary secondary windings being connected in series with each other and in series with said operating coil.

5. A transformer for arc welding comprising two separate primary windings on different cores, a main secondary circuit and an auxiliary secondary circuit, each of which is excited to high voltage when both primary windings are energized and to a reduced voltage when only one of the primary windings is energized, said auxiliary secondary circuit including two windings, one on each of the cores of the separate primary windings, terminals by which one primary winding is connected with an alternating-current supply line during the entire time that the transformer is in operation, a switch for connecting the other of the primary windings with the supply line, a coil for operating the switch, said coil being connected in series with the auxiliary winding that is on the core of the primary winding which is continuously connected with the supply line, and a second switch that in one position connects the auxiliary secondary windings in series with each other and across the main secondary circuit with their voltage opposing that of the main secondary circuit, and in another position makes the continuously-excited winding and coil a closed circuit independent of the main secondary circuit.

6. A welding transformer including two closed iron cores, a primary winding on each of the cores, a single secondary winding embracing a portion of each core, an auxiliary secondary winding on each core in series with each other and connected across the single secondary coil with their voltage opposing that of the secondary winding, separate terminals connected with each end and with a mid-point of the first of the primary windings, switch means for connecting and disconnecting the respective terminals with corresponding points of the second of the primary windings so that said primary windings are in parallel with one another, a common rod for operating all of the switch means simultaneously, a coil for moving the rod to operate the switch means, a conductor connecting the coil in series with the auxiliary windings, and a common frame to which the cores, switch means, coil, and windings are connected to form a composite unit.

7. Transformer apparatus including two separate primary windings, a secondary circuit that is excited to a reduced voltage when only one of the primary windings is energized and to a higher voltage when both of the primary windings are energized, a switch by which the second of the primary windings can be connected with and disconnected from a source of alternating-current power independently of the first of the primary windings, and capacitors for power-factor correction, said capacitors being connected in the circuit of the second of the primary windings and only in the circuit of the second of the primary windings.

8. Transformer apparatus including two separate primary windings, a secondary circuit that is excited to a reduced voltage when only one of the primary windings is energized and to a higher voltage when both of the primary windings are energized, conductors for connecting one of the primary windings with a source of alternating current continuously during the operation of the transformer apparatus, a switch for connecting the other primary windings with the source of alternating current during periods when the secondary circuit of the transformer is loaded, and capacitors connected in the primary circuit on the same side of the switch as said other primary winding so that the capacitors are in the circuit only when the secondary circuit of the transformer is loaded.

9. Arc welding transformer apparatus comprising a first primary winding that is energized to produce a reduced secondary voltage, a second primary winding that is energized to increase the secondary voltage, an overload-protection device including a thermostat that opens a circuit in response to heat generated by the transformer apparatus, switch means for connecting the second primary winding in parallel with the first primary winding, and conductors connecting the thermostat in the circuit of the switch means, said circuit being constructed and arranged to disconnect the second primary winding from the first primary winding upon opening of the thermostat so that the transformer apparatus continues to operate with said reduced secondary voltage.

JOSEPH M. TYRNER.